United States Patent [19]
Bier

[11] 3,760,997
[45] Sept. 25, 1973

[54] GLASS CUTTING USING A DIRECT-CURRENT TORQUE MOTOR

[75] Inventor: David A. Bier, Meadowlands, Pa.

[73] Assignee: PPG Industries, Inc., Pittsburgh, Pa.

[22] Filed: Mar. 26, 1971

[21] Appl. No.: 128,384

[52] U.S. Cl............................. 225/2, 83/8, 83/12, 225/96.5
[51] Int. Cl.......................... C03b 33/10, B26d 3/08
[58] Field of Search ...................... 83/8, 6, 12, 487, 83/488, 489, 428, 503, 506, 579, 577; 225/2, 96, 96.5

[56] References Cited
UNITED STATES PATENTS

| | | | |
|---|---|---|---|
| 2,609,554 | 9/1952 | Bradley............................. | 83/577 X |
| 3,282,140 | 11/1966 | Sasabuchi et al.................. | 83/12 X |
| 3,439,849 | 4/1969 | Matsuzaki et al.................. | 225/96.5 |
| 3,581,615 | 6/1971 | Kaneshige et al.................. | 83/6 X |
| 3,613,974 | 10/1971 | Chatelain et al..................... | 83/6 X |

Primary Examiner—Frank T. Yost
Attorney—Chisholm & Spencer

[57] ABSTRACT

A cutter head in a glass-cutting machine is rigidly connected to a movable member within a constant-reluctance motor. Current is supplied to the motor to move the member and therefore actuate the cutter head. In a preferred embodiment, the constant-reluctance motor is a direct-current torque motor and the movable member is its rotor. In this embodiment, the cutter is downstream of the location of the axis of the rotor as the cutter scores the glass. Score lines of predetermined depth are obtained, despite small variations in thickness of the glass, and without the use of a pneumatic system that is slow-acting and difficult to maintain. Pressure exerted by the cutter head responds rapidly to changes in the current supplied to the motor, making it possible to vary the depth of the score desired during the making of a pattern cut, which could not be done with pneumatic or spring-loaded means of the prior art.

17 Claims, 6 Drawing Figures

INVENTOR
DAVID A. BIER
ATTORNEYS

GLASS CUTTING USING A DIRECT-CURRENT TORQUE MOTOR

BACKGROUND OF THE INVENTION

1. Field of the Invention

This invention relates to the cutting of glass.

2. Description of the Prior Art

Various equipment is known for the cutting of glass, such as U. S. Pat. Nos. 3,107,834; 3,146,926; 3,151,794; and 3,253,756. In none of the foregoing is there used the concept of actuating a cutting head by means of a motor that exerts upon the glass being cut a force that remains substantially constant or is varied at will in a desired and predetermined manner because of the use of a constant-reluctance motor means. Instead, it has been usual in the art of cutting glass to urge the cutter head against the glass either by spring-loaded means or by means of a pneumatic cylinder. Both spring-loaded means an pneumatic-cylinder means have substantial drawbacks. Spring-loaded means are not capable of being adjusted rapidly while a cut is in progress, e.g., in the cutting of a shape such as a windshield blank, so as to exert greater or lesser pressure and generate a score of greater or lesser depth, respectively, in the vicinity of a corner. Pneumatic means have the drawback that they are costly to install and maintain and that they are relatively slow-acting so that it is not ordinarily possible with such pneumatic means to change, as desired, the intended depth of the score.

The broad concept of electrically or electromagnetically moving a cutter head that is used in the cutting of glass is not novel. In this connection, reference is made to U. S. Pat. No. 1,856,128 to J. L. Drake and U. S. Pat. No. 3,276,302 to T. A. Insolio.

The Drake reference states, for example, "the cutters 15 are adapted to be controlled by means of electromagnets 35, a pair of these magnets being preferably though not necessarily provided for each cutter and upon energization thereof, the corresponding cutter or cutters 15 are adapted to be rocked on shaft 14 whereby the cutting tool 29 will be lowered into operative or cutting position." (Page 2, lines 45–53). The reference further states, "Encircling rods 38 and 39 and bearing against arm 16 and nuts 40 are compression springs 41 which serve to yieldably maintain the cutting tool in engagement with the glass sheet during the cutting thereof whereby to automatically compensate for any inequalities in the surface thereof and further to maintain a constant pressure upon the glass to uniformly score the same." (Page 2, lines 65–73).

Insolio discloses, for example, "a solenod is mounted on a frame and when energized extends a pillar post holder and the pillar post downwardly so that the cutting wheel of the pillar post engages and scores relatively moving sheets of glass." (Column 2, lines 67–71).

The problem, however, with prior devices that were employed to maintain cutting forces is that as the cutter encounters variations in glass thickness or undulations due to warping, the air gap in these prior-art devices changes, resulting in a very large change in the applied cutting force. It is by no means unusual for the thickness of the glass being cut to vary a few thousandths of an inch, yet even such relatively small variations in the cutting of pieces of glass having a thickness between about 0.08 and 0.50 inches (about 2 and 12 millimeters, respectively), is likely to lead to considerable variations in the depth of score. There has been, of course, the possibility of using in the vicinity of the cutting wheel a reference wheel that is intended to ride upon the upper surface of the glass being scored, but it has ordinarily been impossible to arrange for any variation in the spacing between such reference wheel and the cutting wheel while the cut is in progress, since means sufficiently fast-acting to permit such adjustment to be made in the depth of the score being produced has been unknown, prior to the instant invention.

It may be considered that direct-current torque motors are, per se, already known. Such devices comprise a rotor of permanent-magnet material of high permeability, suitably keyed to a shaft. In operative association with the permanent-magnet rotor, there are provided a plurality of coils actuated by a variable-magnitude direct-current source, such that when currnt is fed to the coils, there is a tendency for the permanent-magnet rotor to assume a "home" position, and such that whenever the permanent-magnet rotor is away from said "home" position, there is exerted upon the shaft a torque proportional to the magnitude of the direct-current potential provided to the above-mentioned coils.

SUMMARY OF THE INVENTION

Cutter heads in a glass-cutting machine are attached to a shaft that is rigidly connected to a rotor of a direct-current torque motor having a constant reluctance. Score lines of predetermined depth are obtained, despite small variations in the thickness of the glass, and without use of a pneumatic system that is slow-acting and difficult to maintain. The pressure exerted by the cutter head responds rapidly to changes in direct-current potential supplied to the torque motor, making it possible to vary the depth of the score as desired during the making of a pattern cut, which could not be done with the pneumatic or spring-loaded means of the prior-art devices. After the score line is applied to the glass, a bending moment is applied about the score line to sever a piece of glass. It will be apparent to one skilled in the art that there are numerous devices commerically available to apply such a bending moment.

In some situations, such as where the cutter has a sharp cutting angle and is applied to the glass under relatively high pressure, the cutter creates a fracture that extends to the bottom of the surface of the glass and a bending moment is not necessary to sever a piece of glass.

DESCRIPTION OF THE DRAWINGS

A complete understanding of the invention may be obtained from the foregoing and following description thereof, taken in conjunction with the appended drawings, which are diagrammatic and not to scale, unless noted, and in which.

DESCRIPTION OF THE PREFERRED EMBODIMENT

Figure 1:
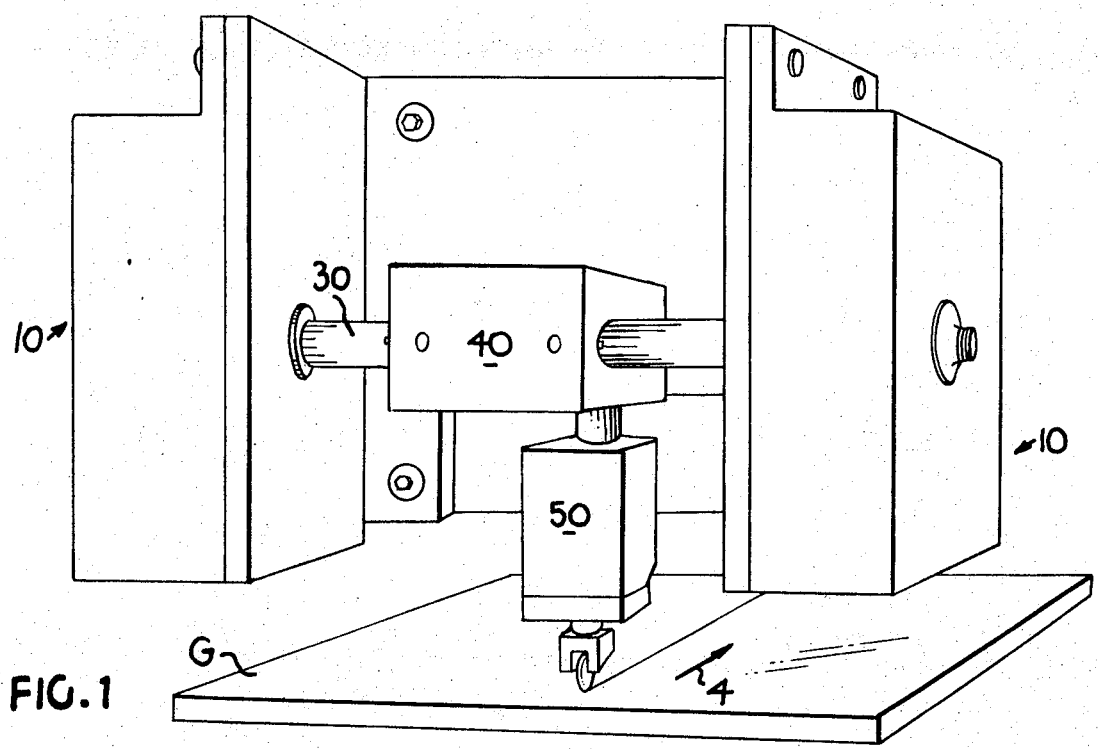
FIG. 1 is a diagram indicating a cutting apparatus according to the present invention scoring a sheet of glass.

Referring to FIG. 1, there is shown an apparatus made in accordance with the present invention applying a score line 2 to a piece of glass G as it moves in the direction of arrow 4. Cutter head assembly 50 is attached to block 40 which is mounted on shaft 30. This shaft is rigidly coupled to the rotors of direct-current torque motors 10. While two motors have been illustrated, this is merely an example and the number of motors is determined by the torque required to provide a suitable force to the glass, and the capacity of each motor. For example, if each torque motor supplies a torque of 100 inch-ounces and the effective moment arm is ¾ of an inch, a scoring force of about 17 pounds is supplied to the cutter. This force can be varied by adjusting the current supplied to the motor or the size of the moment arm. Further, although a rotary-type torque motor has been illustrated, the invention should not be limited to such a motor. A linear-type torque motor (where the movable member slides with respect to the stationary member) may also be used, with the cutter assemby attached to the movable member. Here, however, there is a higher inertia required than in the rotary-type torque motor. The rotary-type torque motor has a "trailing-arm" effect. In other words, the cutter is downstream of the location of the axis of the rotor as the cutter scores the glass. Any variation in the location of the glass surface will cause the cutter to pivot about the axis, and this exhibits less inertia than is necessary to move vertically a cutter attached to a linear-type torque motor. This is because the moment of inertia of a mass against rotation is lower than its moment of inertia against translation.

Figure 2:
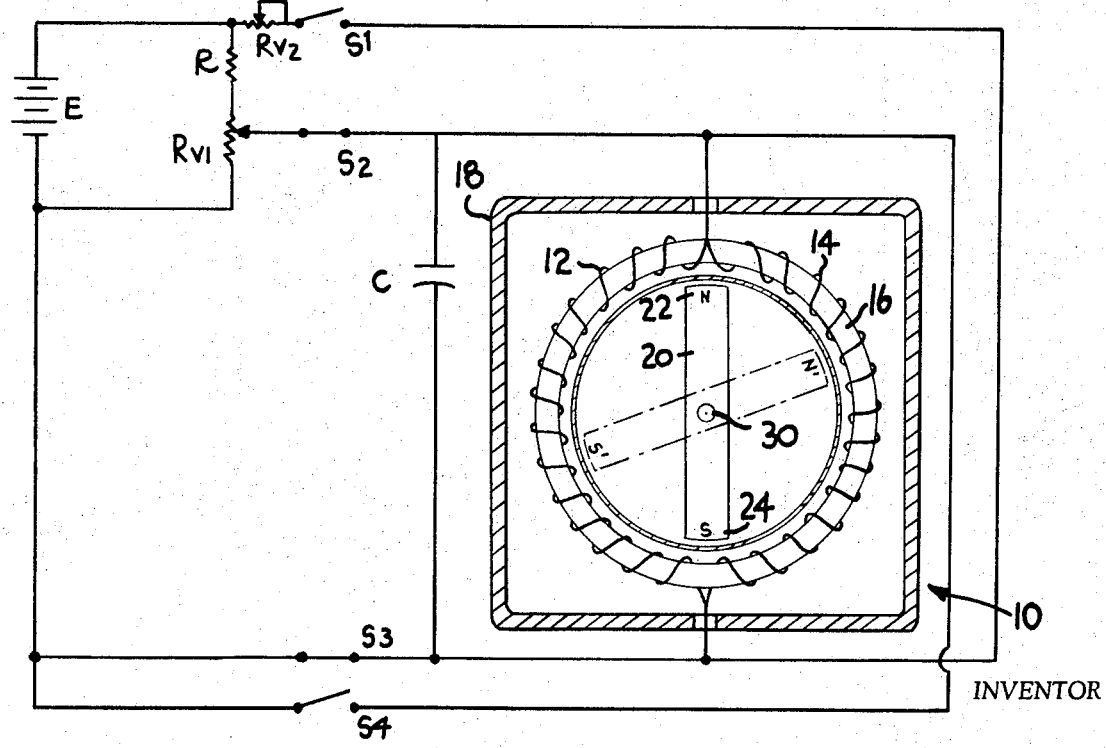
FIG. 2 is a diagram illustrating a circuit used to supply current to the motor.

Referring to FIG. 2, a direct-current torque motor, indicated generally as 10, may be considered as comprising a pair of coils 12 and 14 wound around an annular stator core 16 within a housing 18. Within stator core 16 and coils 12 and 14 and spaced therefrom is a permanent-magnet rotor 20.

When it is desired to lower cutter head assembly 50 into position to score the piece of glass G, current is supplied from a source E through a fixed resistance R and a variable resistance $R_{v1}$. Switches $S_2$ and $S_3$ are closed and switches $S_1$ and $S_4$ are opened (as shown in FIG. 2). The amount of current supplied to motor 10 can be minimized by increasing the resistance in variable resistor $R_{v1}$. This is very important since it allows one to both reduce the force with which the cutter initially engages glass G and control the force with which the cutter scores glass G. Further, capacitor C is placed in parallel with motor 10 to delay the supply of current to motor 10. The size of capacitor C is chosen so that little current is supplied to torque motor 10 until the cutter contacts the piece of glass G. This also reduces the force with which the cutter initially engages glass G. As this small amount of current is supplied to torque motor 10, a counter-EMF is generated within the torque motor to oppose a rapid rotation of permanent-magnet rotor 20. The force actually supplied to the cutter before it engages the glass is very small (about 1 pound).

The passage of direct current through the coils 12 and 14 generates within the motor 10 a suitable electrical field, tending to influence the location of the rotor 20, which is made of a permanent-magnet material such as an Alnico alloy of high energy product. The rotor has a north pole 22 and a south pole 24. It also has a central opening 26 which can be threaded to receive shaft 30. When the rotor 20 is in the position indicated in the dash-dot lines in FIG. 2, and direct-current is supplied to the torque motor (with switches $S_2$ and $S_3$ closed and switches $S_1$ and $S_4$ open, as illustrated in FIG. 2), there is exerted upon the rotor 20 a force that tends to turn the rotor 20 to the position indicated in solid lines in FIG. 2.

Figure 3:
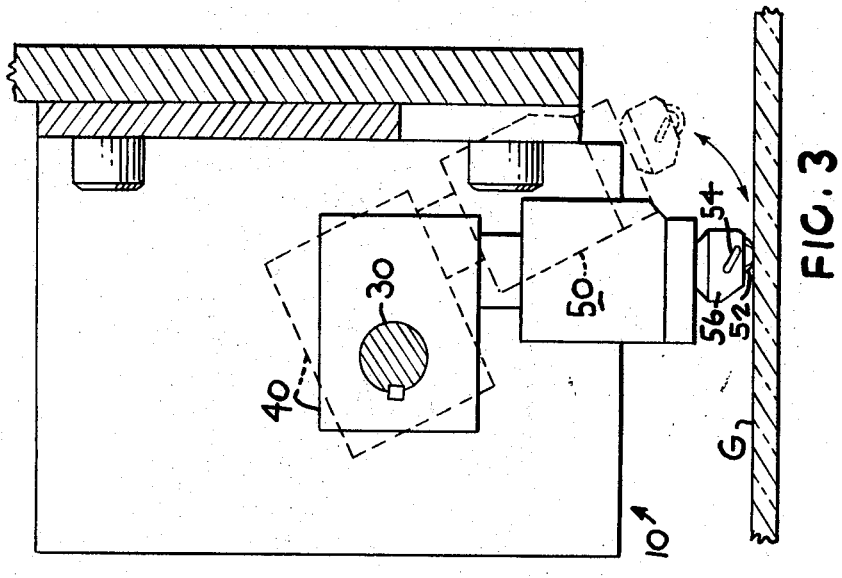
FIG. 3 is a side view of the cutter head assembly shown in FIG. 1 both before and during the scoring operation.

It must be kept in mind that there is a direct relationship between the position of rotor 20 and the location of the cutter head assembly 50. When rotor 20 is in the position indicated by dash-dot lines in FIG. 2, cutter head assembly 50 is spaced from the piece of glass G as indicated by dash-dot lines in FIG. 3. As rotor 20 moves to the position indicated by solid lines in FIG. 2, the cutter head assembly 50 moves into position to score the piece of glass G, as indicated by the solid lines in FIG. 3. This is because the cutter head assembly 50 is rigidly attached to block 40 which is rigidly mounted on shaft 30 which is rigidly mounted with rotor 20.

After score line 2 has been completed and it is desired to raise cutter head assembly 50 to the position shown in dash-dot lines in FIG. 2, switches $S_2$ and $S_3$ are opened and switches $S_1$ and $S_4$ are closed (not illustrated). This has the effect of reversing the polarity on torque motor 10 so that direct current is supplied in an opposite direction to return rotor 20 to the position indicated by dash-dot lines in FIG. 2. The resistance in variable resistor $R_{v2}$ can be adjusted to vary the amount of current supplied to torque motor 10 to raise cutter head assembly 50. This variable resistor, together with capacitor C, controls the rate with which the cutter head assembly 50 is raised.

Figure 4:
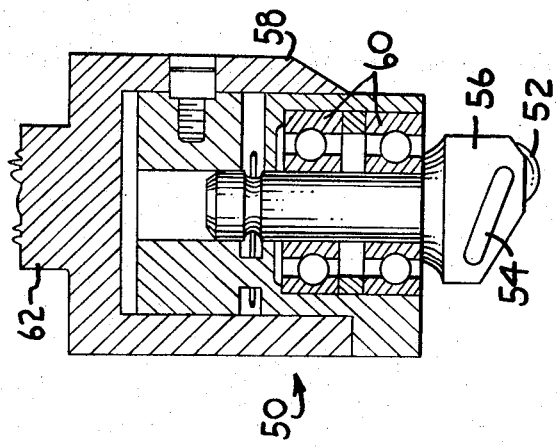
FIG. 4 is a diagram of a cutter head assembly.
Figure 5:
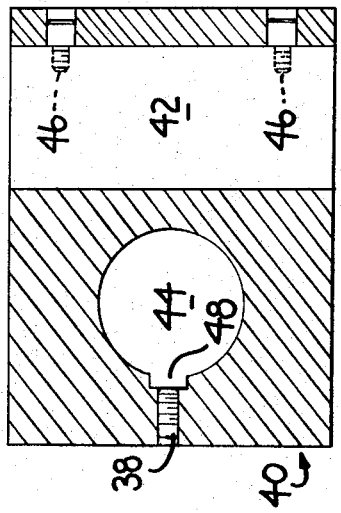
FIG. 5 is a diagram of a block used to mount the cutter head to the shaft of FIG. 3.
Figure 6:
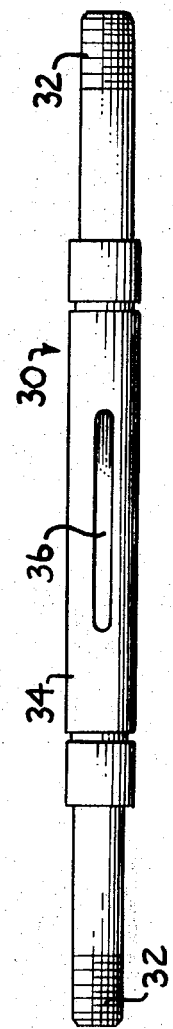
FIG. 6 is a diagram illustrating a shaft used to mount the cutter head to the rotor of the motor.

FIGS. 4, 5 and 6 indicate various details of the apparatus made in accordance with the present invention. Referring to FIG. 4, there is illustrated the details of a typical cutter head assembly 50. Assembly 50 includes a cutting wheel 52 mounted on a pillar post 56 by a wheel axle 54. Cutting wheel 52 can be made of any standard material such as sintered tungsten carbide, possibly having a diameter such as ½ inch (about 3 millimeters) or less with a cutting angle such as about 160° or less. Pillar post 56 is mounted within body 58. Bearings 60 allow pillar post 56 and therefore cutting wheel 52 to pivot within body 58. Shaft-like portion 62 extends upwardly from the top of body 58.

Referring to FIGS. 5 and 6, there is shown a block 40 having holes 42 and 44 extending therethrough, and a shaft 30 with threaded end portions 32 for mounting shaft 30 in the threaded central openings 26 of the rotors 20, respectively.

In operation, shaft-like portion 62 of cutter head assembly 50 is inserted into hole 42 of block 40 and any suitable means, such as allen screws 46 maintain shaft-like portion 62 (and therefore cutter head assembly 50) in position within block 40. Hole 44 is sized to receive central portion 34 of shaft 30. Longitudinal projection 36 fits into slot 48 to prevent shaft 30 from rotating within block 40. Allen screws 38 prevent shaft 30 from sliding within block 40.

Those skilled in the art will understand that, in most instances, it is essential that the force exerted by the cutter head upon the glass be on the order of 10 pounds, and preferably about 20 pounds or more, in order that a score of suitable depth may be obtained. If the wheel contained in the cutter head assembly is extremely sharp, it will, in some instances, be possible to use a lesser pressure. On the other hand, it is desirable not to use a pressure so great as to cause immediate fracturing of the glass being cut throughout its thickness.

For the most part, it is desirable that the score (except when the cross-cutting of a glass ribbon, complete with edge portions and/or edge bulbs, is being practiced) be located at a suitable distance with respect to the piece being scored for cutting, such as a minimum of 6 or 8 times the thickness of the glass.

The present invention has particular importance in connection with the cutting of a large sheet or ribbon of glass into a plurality of segments by means of a plurality of cutter heads located upon a cutter bar. In accordance with prior-art practices, it has been hitherto considered necessary either to use the pneumatic system, with its attendant dangers of the kinking or the wearing of the cords or lines connecting the pneumatic supply source to the cutter heads, or to use a spring-loaded apparatus, with its attendant difficulty that it is inconvenient to adjust the spring means associated with each of the cutter heads so that score line of adequate and desired depth is obtained.

Although the invention has been described in connection with a direct-current torque motor, it will be apparent to those skilled in the art that other suitable constant-reluctance motor means may be devised and used. What is required is that there be provided an electrical or magnetic means that operates on the basis of a substantially constant air gap and a substantially constant environment of magnetic permeability. This is to be distinguished from the use of an electromagnet or solenoid where the air gap goes from a substantial value such as ⅛ of an inch (about 3 millimeters) or more to substantially zero, possibly with occasional excursions thereafter of up to 1/12 of an inch (about 2 millimeters). With the use of such equipment, it is substantially impossible to exert a constant force, as is contemplated in accordance with the principles of the present invention.

Those skilled in the art of cutting glass will appreciate from the foregoing disclosure that remarkable novel effects can be obtained if the series of sheets or moving ribbon is cut by means of a set of cutters of the kind taught above that operate, one set transversely of the glass in its travel, and one set longitudinally, with the positioning of the cutter heads being automatically controlled and with the cutter heads being raised or lowered at precisely chosen moments. The actuation is so quick and precise that it becomes possible to envision using interrupted-cut practices that were hitherto impractical. The losses, in changing from one pattern of cutting to another, are much reduced. With the faster and more reliable action obtained with the present invention, it is possible to cut more closely around a defect, so that less glass is discarded. The cutting of flat glass to meet a customer's size specification may be accomplished substantially more efficiently, rapidly and conveniently when the instant invention is practiced.

I claim as my invention:

1. An apparatus for the scoring of glass comprising:
   a. an adjustable source of electric current,
   b. a constant-reluctance motor means operatively connected to said source of current, and
   c. a cutting means for scoring said glass, said cutting means being rigidly connected to a rotatable movable member within said constant-reluctance motor means.

2. An apparatus as defined in claim 1, characterized in that said constant-reluctance motor means comprises a torque motor.

3. An apparatus as defined in claim 2, characterized in that said movable member comprises a rotor.

4. An apparatus as defined in claim 3, characterized in that said torque motor is a direct-current torque motor.

5. An apparatus as defined in claim 4, characterized in that a capacitor is placed in parallel with said torque motor to reduce the current on said motor as said cutting means is moved into position to score said glass.

6. An apparatus as defined in claim 4, characterized in that said adjustable source of electric current includes a variable resistor.

7. An apparatus as defined in claim 6, characterized in that a capacitor is placed in parallel with said torque motor to reduce the current on said motor as said cutting means is moved into position to score said glass.

8. An apparatus for the cutting of glass comprising:
   a. an adjustable source of electric current,
   b. a constant-reluctance motor means operatively connected to said source of current, and
   c. a cutting means for cutting said glass, said cutting means being rigidly connected to a rotatable movable member within said constant-reluctance motor means.

9. An apparatus as defined in claim 8, characterized in that said constant-reluctance motor means comprises a torque motor.

10. An apparatus as defined in claim 9, characterized in that said movable member comprises a rotor.

11. An apparatus as defined in claim 10, characterized in that said torque motor is a direct-current torque motor.

12. A method of producing a score line of predetermined depth upon a sheet of glass comprising:
    a. moving said sheet of glass with respect to a cutter head means, and
    b. actuating a constant-reluctance motor means to rotatably urge said cutter head means into a surface of said glass sheet.

13. A method as defined in claim 12, characterized in that said motor means comprises a torque motor.

14. A method of severing a piece of glass comprising:
    a. moving said sheet of glass with respect to a cutter head means, and
    b. actuating a constant-reluctance motor means to rotatably urge said cutter head means into a surface of said glass sheet.

15. A method as defined in claim 14, characterized in that said motor means comprises a torque motor.

16. A method of severing a piece of glass comprising:
    a. moving said sheet of glass with respect to a cutter head means,
    b. actuating a constant-reluctance motor means to rotatably urge said cutter head means into a surface of said glass sheet, and
    c. applying a bending moment about a score line produced by said cutter head means.

17. A method as defined in claim 16, characterized in that said motor means comprises a torque motor.

* * * * *